(12) United States Patent
Morford et al.

(10) Patent No.: US 7,496,661 B1
(45) Date of Patent: Feb. 24, 2009

(54) ADAPTIVE, APPLICATION-AWARE SELECTION OF DIFFERENTIATED NETWORK SERVICES

(75) Inventors: Michael Robert Morford, Saratoga, CA (US); Robert E. Purvy, San Jose, CA (US)

(73) Assignee: Packeteer, Inc., Sunnyvale, CA (US)

(*) Notice: Subject to any disclaimer, the term of this patent is extended or adjusted under 35 U.S.C. 154(b) by 1032 days.

(21) Appl. No.: 10/812,198

(22) Filed: Mar. 29, 2004

(51) Int. Cl.
*G06F 15/16* (2006.01)
*G06F 12/00* (2006.01)
(52) U.S. Cl. .................................. 709/224; 709/225
(58) Field of Classification Search ................ 709/223, 709/224–226, 250, 232
See application file for complete search history.

(56) References Cited

U.S. PATENT DOCUMENTS

| | | | | |
|---|---|---|---|---|
| 5,164,983 A | * | 11/1992 | Brown et al. ........... | 379/265.03 |
| 5,793,976 A | * | 8/1998 | Chen et al. ................... | 709/224 |
| 5,802,106 A | * | 9/1998 | Packer ......................... | 375/225 |
| 6,674,760 B1 | * | 1/2004 | Walrand et al. ............. | 370/411 |
| 6,898,635 B2 | * | 5/2005 | Jung ........................... | 709/226 |
| 6,965,592 B2 | * | 11/2005 | Tinsley et al. ............... | 370/352 |
| 7,010,611 B1 | * | 3/2006 | Wiryaman et al. .......... | 709/232 |
| 7,133,360 B2 | * | 11/2006 | Le Gouriellec et al. ..... | 370/229 |
| 7,353,269 B2 | * | 4/2008 | Aki et al. .................... | 709/224 |

* cited by examiner

*Primary Examiner*—Zarni Maung
(74) *Attorney, Agent, or Firm*—Baker Botts L.L.P.

(57) ABSTRACT

Methods, apparatuses and systems that dynamically adjust the selection of differentiated network services for selected classes of traffic in response to changing network conditions or application performance levels. In one implementation, the present invention allows for a differentiated network services scheme that adapts to existing network conditions and, in one implementation, selects higher, generally more expensive classes of differentiated network service for certain data flows when the performance of selected applications degrades below a threshold level. The present invention, in one implementation, allows for bandwidth cost savings without sacrificing application performance.

29 Claims, 7 Drawing Sheets

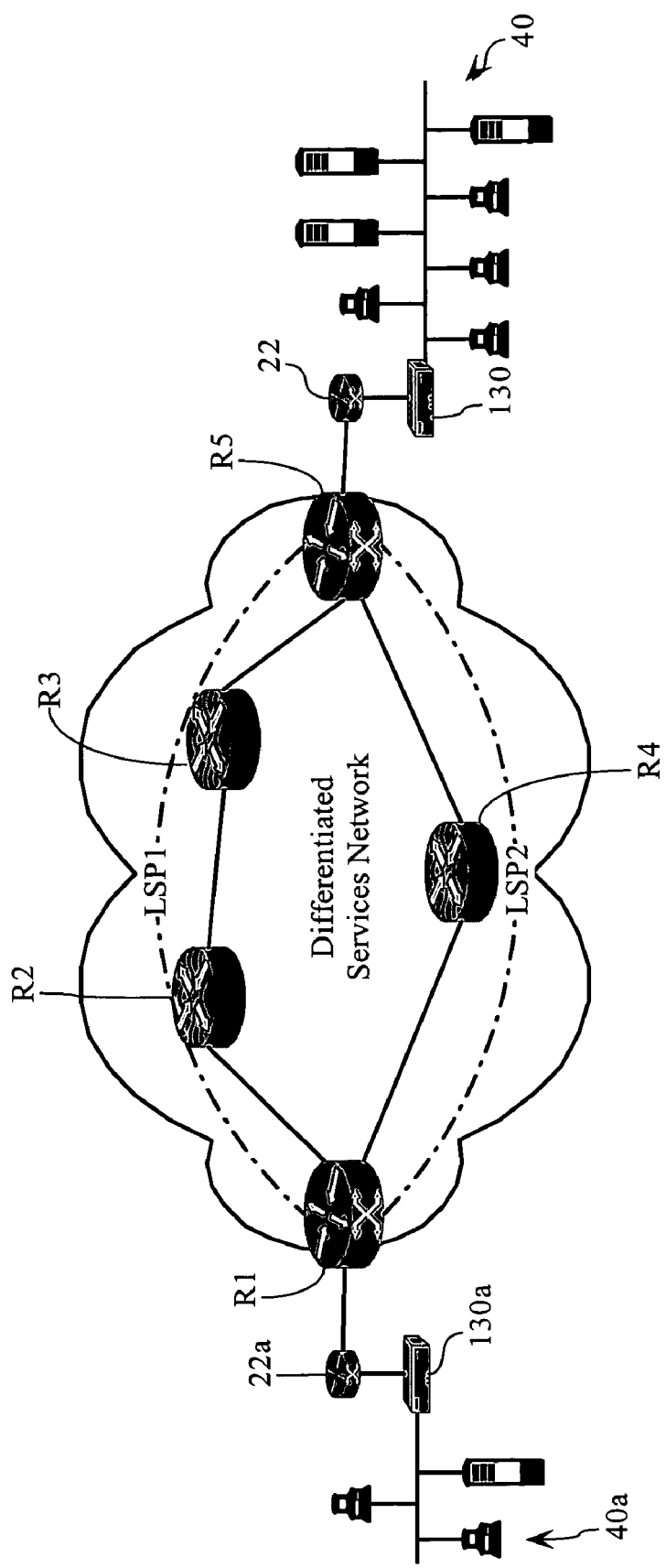
Fig_1

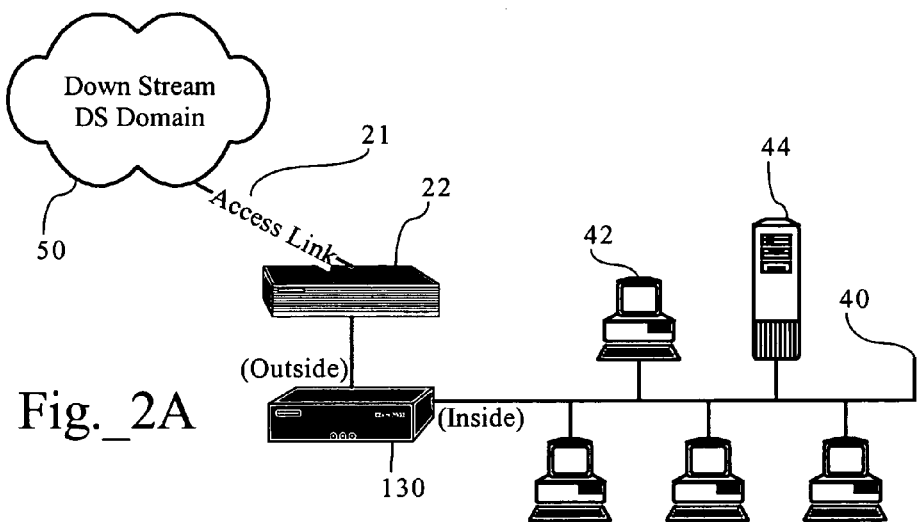
Fig._2A
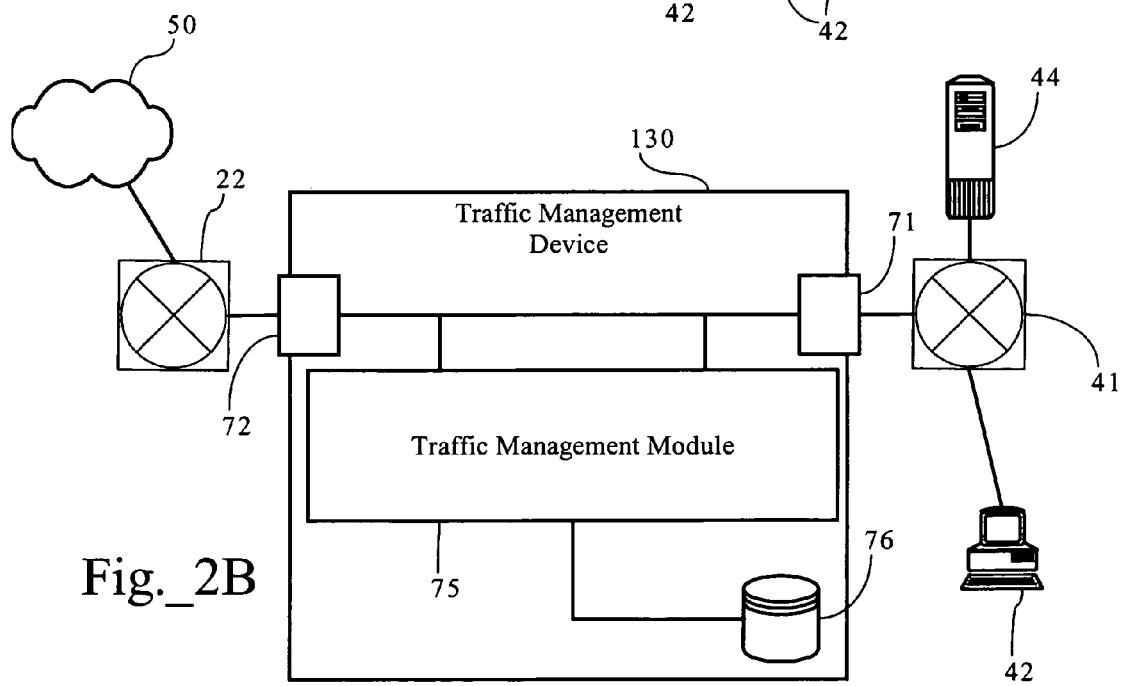
Fig._2B

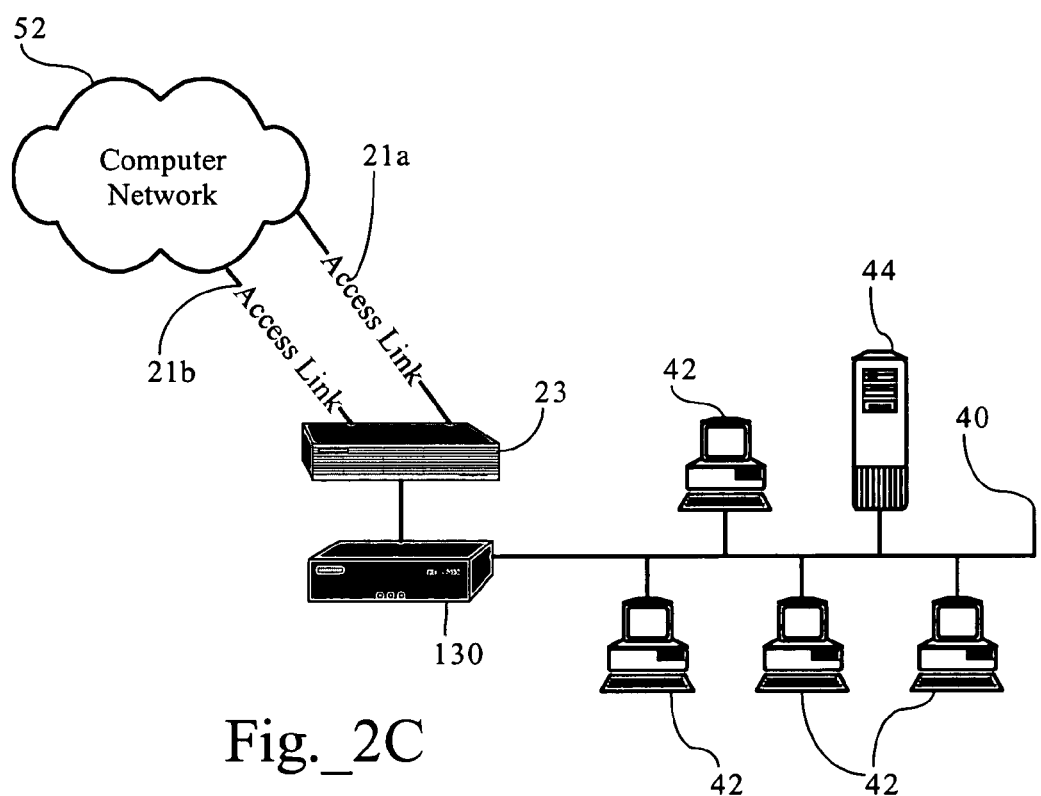
Fig._2C

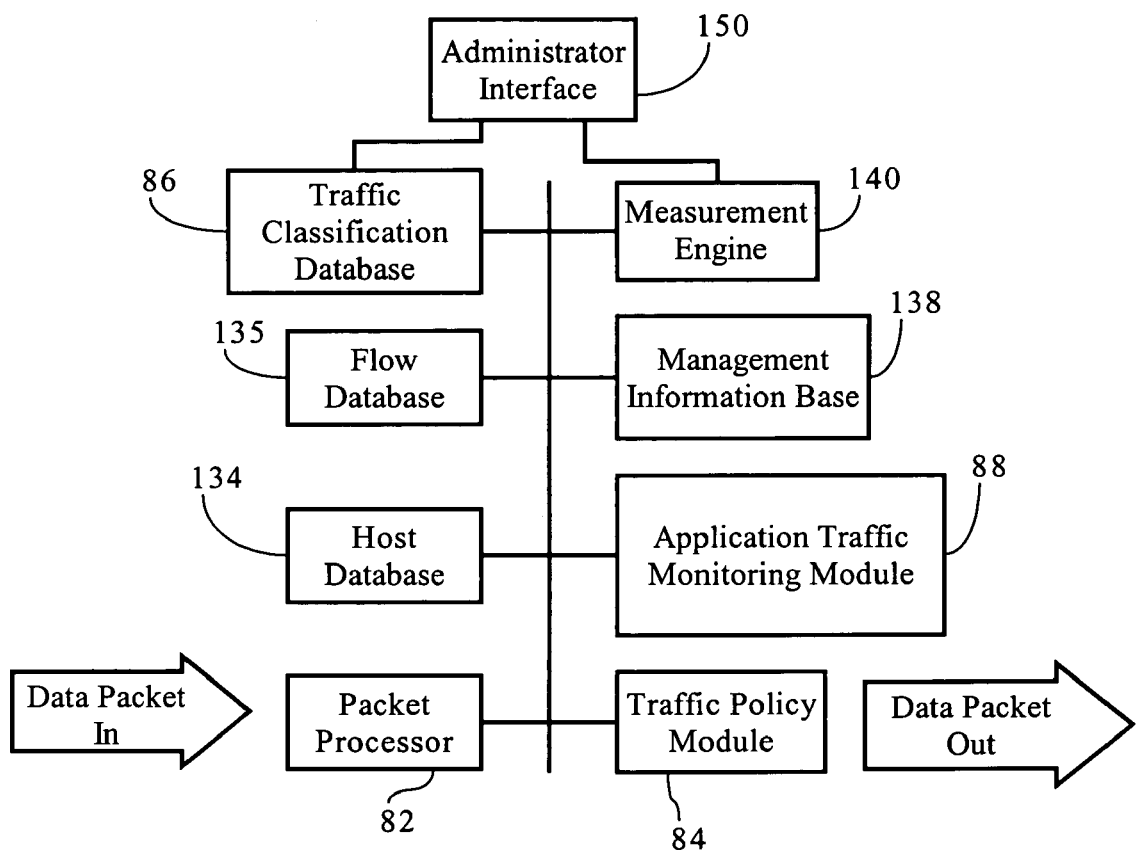
Fig._3

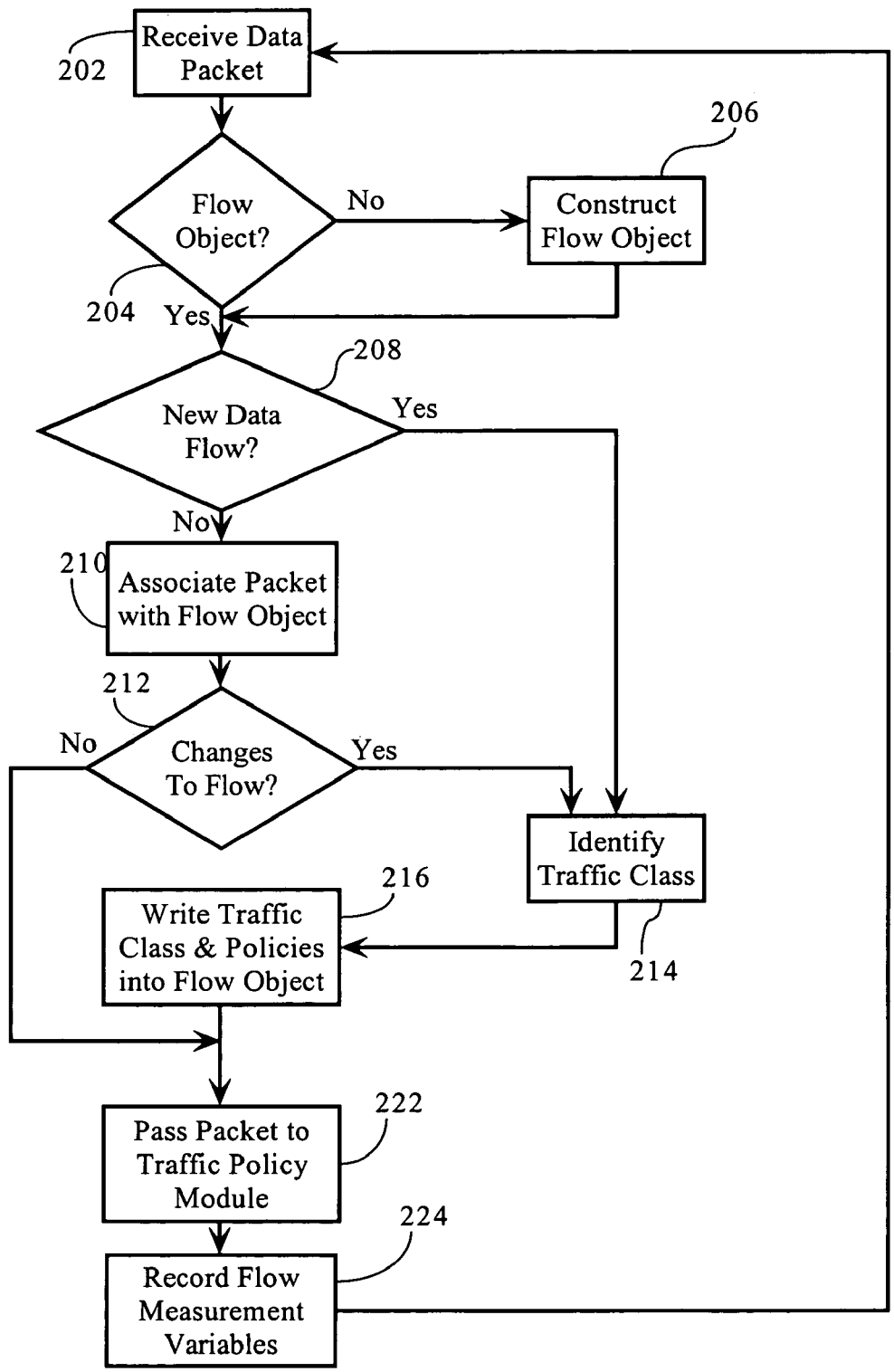
Fig._4

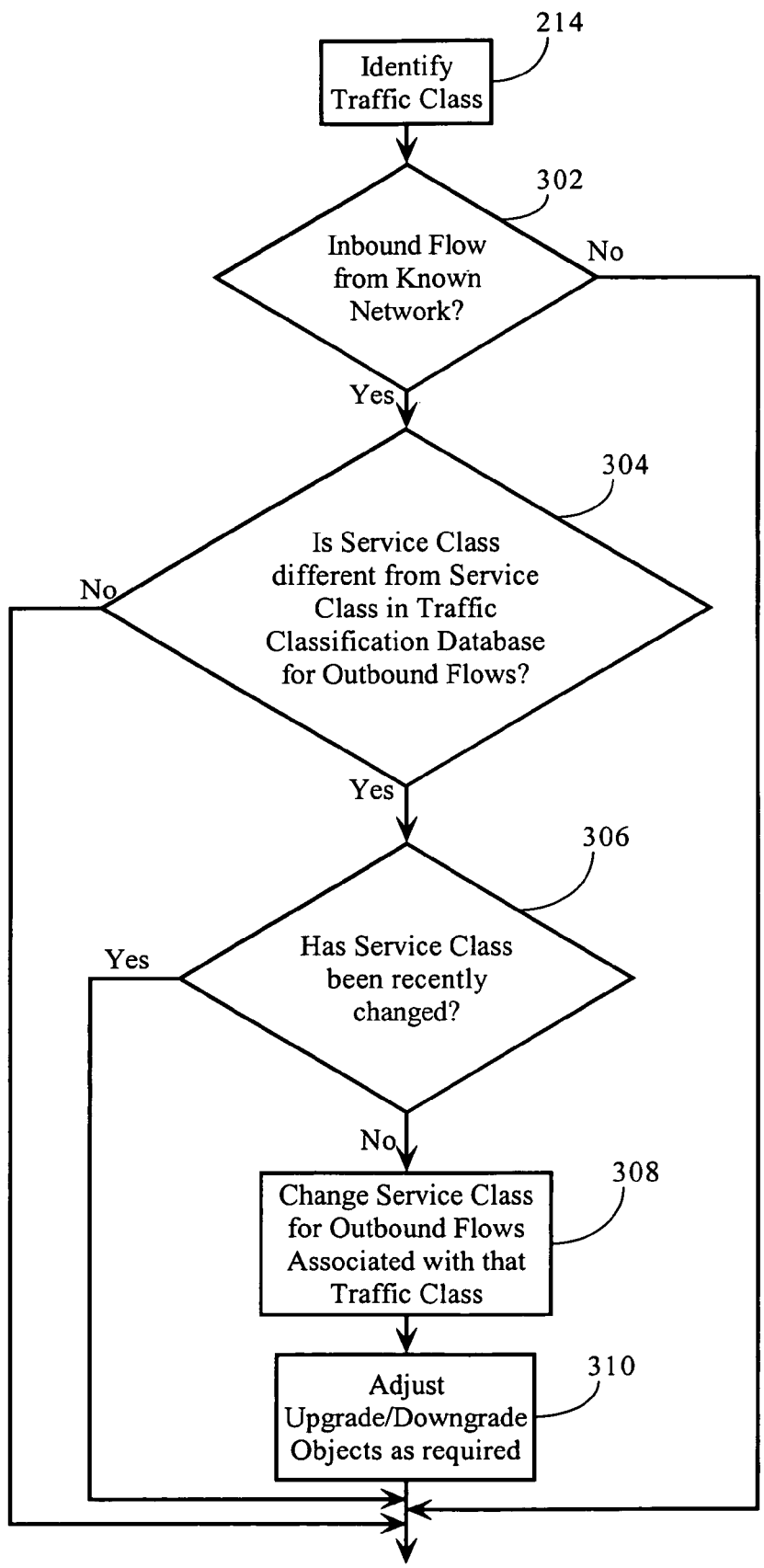
Fig._6

ADAPTIVE, APPLICATION-AWARE SELECTION OF DIFFERENTIATED NETWORK SERVICES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS-REFERENCE TO RELATED APPLICATIONS AND PATENTS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/099,629 in the name of Brett Galloway, Mark Hill, and Anne Cesa Klein, entitled "Method And System For Controlling Network Traffic Within The Same Connection With Different Packet Tags By Varying The Policies Applied To A Connection;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/453,345, in the name of Scott Hankins, Michael R. Morford, and Michael J. Quinn, entitled "Flow-Based Packet Capture;" and U.S. patent application Ser. No. 10/611,573, in the name of Roopesh Varier, David Jacobson, and Guy Riddle, entitled "Network Traffic Synchronization Mechanism."

FIELD OF THE INVENTION

The present invention relates to computer networks and, more particularly, to application-aware, adaptive network traffic management schemes that selectively designates data flows for differentiated network services in response to monitored network or application performance attributes.

BACKGROUND OF THE INVENTION

Enterprises have become increasingly dependent on computer network infrastructures to provide services and accomplish mission-critical tasks. Indeed, the performance and efficiency of these network infrastructures have become critical as enterprises increase their reliance on distributed computing environments and wide area computer networks. The widely-used TCP/IP protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily. The above-identified U.S. patents and patent applications provide explanations of certain technical aspects of a packet based telecommunications network environment, such as Internet/Intranet technology based largely on the TCP/IP protocol suite, and describe the deployment of bandwidth management solutions to monitor and manage network environments using such protocols and technologies.

Enterprises network topologies can span a vast array of designs and connection schemes depending on the enterprises resource requirements, desired service levels, costs and the like. Enterprise network design topologies often include redundant LAN and WAN segments in the enterprises intranet, and multiple paths to extranets and the Internet. Enterprises that cannot afford the expense of private leased-lines to develop their own WANs, often employ frame relay, or other packet switched networks, together with Virtual Private Networking (VPN) technologies to connect private enterprise sites via a service provider's public network or the Internet. Some enterprises also use VPN technology to create extranets with customers, suppliers, and vendors.

To create more efficient and cost effective network services, various differentiated service technologies and protocols have been developed. A differentiated service defines some significant characteristics of packet transmission in one direction across a set of one or more paths within a network. These characteristics may be specified in quantitative or statistical terms of throughput, delay, jitter, and/or loss, or may otherwise be specified in terms of some relative priority of access to network resources. Service differentiation is desired to accommodate heterogeneous application requirements and user expectations, and to permit differentiated pricing of network service. Differentiated services can include diffserv (RFC 2475), relative priority marking, service marking, label switching, Integrated Services/RSVP, and static per-hop classification.

For example, Internet Protocol (IP) networks, without modification, essentially provide best-effort datagram service without distinguishing between types of flows. To support and manage the performance of networked applications, a variety of core network technologies have been developed to deliver tailored network services. For example, many networked applications, such as VoIP, or other real-time transport protocol (RTP) flows, require higher quality of service, relative to other applications, such as e-mail and FTP file transfers. This type of network traffic generally includes characteristics of low latency, low jitter, and delay sensitivity; for example, voice over IP (VoIP), or video over IP traffic. Accordingly, a variety of technologies and protocols have been developed to provide differentiated services over IP networks, such as Multi-Protocol Label Switching (MPLS), and diffserv.

FIG. 1 illustrates, for didactic purposes, a simple differentiated services network, such as a MPLS network, consisting of five routing nodes: R1, R2, R3, R4, and R5. Router R5 is connected to a network segment 40 that contains a subnet with specific destination hosts associated with, for example, an enterprise headquarters. Router R1 is operably connected to a network 40a associated with, for example, a branch office. Routers R1 and R5 are referred to as label-edge routers (LERs), while routers R2, R3, and R4 are label-switching routers (LSRs). LERs receive incoming network traffic (e.g., IP, Ethernet, ATM, frame relay, etc.), and route this network traffic into special-purpose label-switched paths (LSPs) created to span the network or some part of the network. FIG. 1 illustrates two such LSPs: LSP1 and LSP2. For didactic purposes, assume that LSP1 has been created to carry real-time traffic through the network. LSP2 has been created to carry non-real-time traffic, such as email. Often, the network service provider charges its enterprise customers a higher rate for the use of LSP1.

The label switched paths in the MPLS network can be configured or provisioned using signaling protocols such as Resource Reservation Protocol with traffic engineering extensions (RSVP-TE) and Label Distribution Protocol (LDP). For example, LSP1 can be configured as an MPLS tunnel. An MPLS tunnel is basically a label switched path with some type of associated set of constraints, such as a specified path, resource reservation across the path, and other QoS-related capabilities (e.g., DiffServ/IntServ service classes). As FIG. 1 illustrates, the specified path of LSP1 from the branch office to headquarters is routers R1-R2-R3-R5. Resource reservation along the path generally connotes quality of service (QoS). Resource reservation often includes minimum guaranteed or required bandwidth, as well as other traffic characteristics, such as maximum burst size, mean burst size, and so on. These characteristics are specified or used when signaling the nodes in a label switched path as part of the underlying router resource reservations. For example, resource reservation generally includes reserving port buffer space, hardware queues, fabric capacity, etc.

Additional QoS requirements on a given label switched path can also be specified or configured using DiffServ and IntServ classes. These classes provide a greater degree of control over how the incoming traffic is managed as it passes across the MPLS network. In the didactic example of FIG. 1, LSP2 (R1, R4, R5) can created using the LDP protocol. This label switched path has no reserved bandwidth and its path is created by R1, in one direction, in conjunction with its internal routing protocols.

The resulting MPLS core network is then packet-based using MPLS and some specified QoS mechanism such as DiffServ, IntServ, and so on. According to the MPLS protocol, a short fixed-length label is generated that acts as a shorthand representation of an IP packet's header. Subsequent routing decisions (made by Label Switched routers) are made based on the MPLS label and not the original IP address in the IP header. This technology allows core network routers to operate at higher speeds without needing to examine each packet in detail, and allows more complex services to be developed, allowing discrimination on a QoS basis. Other parameters can also be used for forwarding: source IP address, source/destination port, IP type of service field (now called the Differentiated Services field, as defined in RFC 3260).

As discussed above, MPLS networks support a variety of QoS mechanisms including IP Precedence, Committed Access Rate (CAR), Random Early Detection (RED), Weighted RED, Weighted Fair Queuing (WFQ), Class-based WFQ, and Priority Queuing. Proprietary and non-standard QoS mechanisms can also be supported. MPLS may also be integrated with Differentiated Services protocols, such as diffserv, to provide for a plurality of service classes. For example, a service provider may deploy an MPLS network that has the following QoS classes: 1) High-priority, low-latency "Premium" class—(Gold Service); 2) Guaranteed-delivery "Mission-Critical" class—(Silver Service); and 3) Low-priority "Best-Effort" class—(Bronze Service).

Many MPLS networks are managed by managed network service providers that bill or charge enterprises based on a flat-rate, a usage-based model, or a combination of the two. A variety of tiered rate models can be used as well. Usage can be computed based on the number of IP packets forwarded (via MPLS) across an LSP, average bit rate, and the like. For example, a typical enterprise may pay for the use of LSP2 based on a flat-rate model, while paying for data transfer across LSP1 based on usage. Not surprisingly, different combinations of label switched paths and/or QoS classes may each have different rates, obviously, with higher classes of service being more expensive.

In addition to MPLS and other differentiated service networks, many enterprises often have redundant connections between any two given sites, or even redundant physical connections between a given site and the Internet. Often these connections or links differ in capabilities and cost. Routers, typically using Border Gateway Protocols (BGP) to select a path to a given destination host do not account for cost, performance or the application associated with the data flow. A variety of network vendors have tried to optimize performance and/or reduce costs by controlling and modifying the routing policies on edge routers that would otherwise result with BGP. These route optimization approaches, however, generally involve complex and intensive technical requirements difficult for most network managers to use and configure. In addition, such network routing policy appliances, however, do not perform route optimization based on the network application associated with the data flow, rendering it difficult, if not impossible, to control data flows on a per-application basis.

In attempting to control the cost of network bandwidth, enterprises typically balance cost against performance. The network configuration and provisioning, however, that results from this cost-versus-performance analysis is generally performed at one instance in time, and does not adapt to changing network conditions. For example, it may be advantageous to an enterprise to use a least cost path to a given destination host until the performance of one or more network applications of interest, or other classes of traffic, suffers. At that point, a different, higher-cost path can be selected for the selected application traffic. Still further, enterprises may desire to tolerate low performance for low priority applications, while selectively increasing service levels for high priority applications. Known prior art mechanisms, however, are not application aware. Furthermore, known mechanisms do not dynamically adjust to changing network conditions or network application performance in this manner.

In light of the foregoing, a need in the art exists for methods, apparatuses and systems that dynamically adjust the selection of differentiated network services for selected classes of traffic in response to changing network conditions or application performance levels. Embodiments of the present invention substantially fulfill this need.

SUMMARY OF THE INVENTION

The present invention provides methods, apparatuses and systems that dynamically adjust the selection of differentiated network services for selected classes of traffic in response to changing network conditions or application performance levels. In one implementation, the present invention allows for a differentiated network services scheme that adapts to existing network conditions and, in one implementation, selects higher, generally more expensive classes of differentiated network service for certain data flows when the performance of selected applications degrades below a threshold level. The present invention, in one implementation, allows for bandwidth cost savings without sacrificing application performance.

DESCRIPTION OF THE DRAWINGS

FIG. 1 is a schematic diagram of a computer network environment including a differentiated services network, such as a MPLS core network, interconnecting a first network and a second network.

FIG. 2A is a schematic diagram illustrating a computer network operably connected to a downstream differentiated service (DS) capable domain.

FIG. 2B is a functional block diagram illustrating a traffic management device according to an implementation of the present invention.

FIG. 2C is a schematic diagram illustrating a first computer network connected to a second computer network by a plurality of access links.

FIG. 3 is a functional block diagram setting forth the functionality in a traffic management device according to an embodiment of the present invention.

FIG. 4 is a flow chart diagram providing a method, according to an embodiment of the present invention, directed to the processing of packets.

FIG. 6 is a flow chart diagram showing a method, according to one implementation of the present invention, directed to coordinating the operation of two traffic management devices.

DESCRIPTION OF PREFERRED EMBODIMENT(S)

Figure 5:
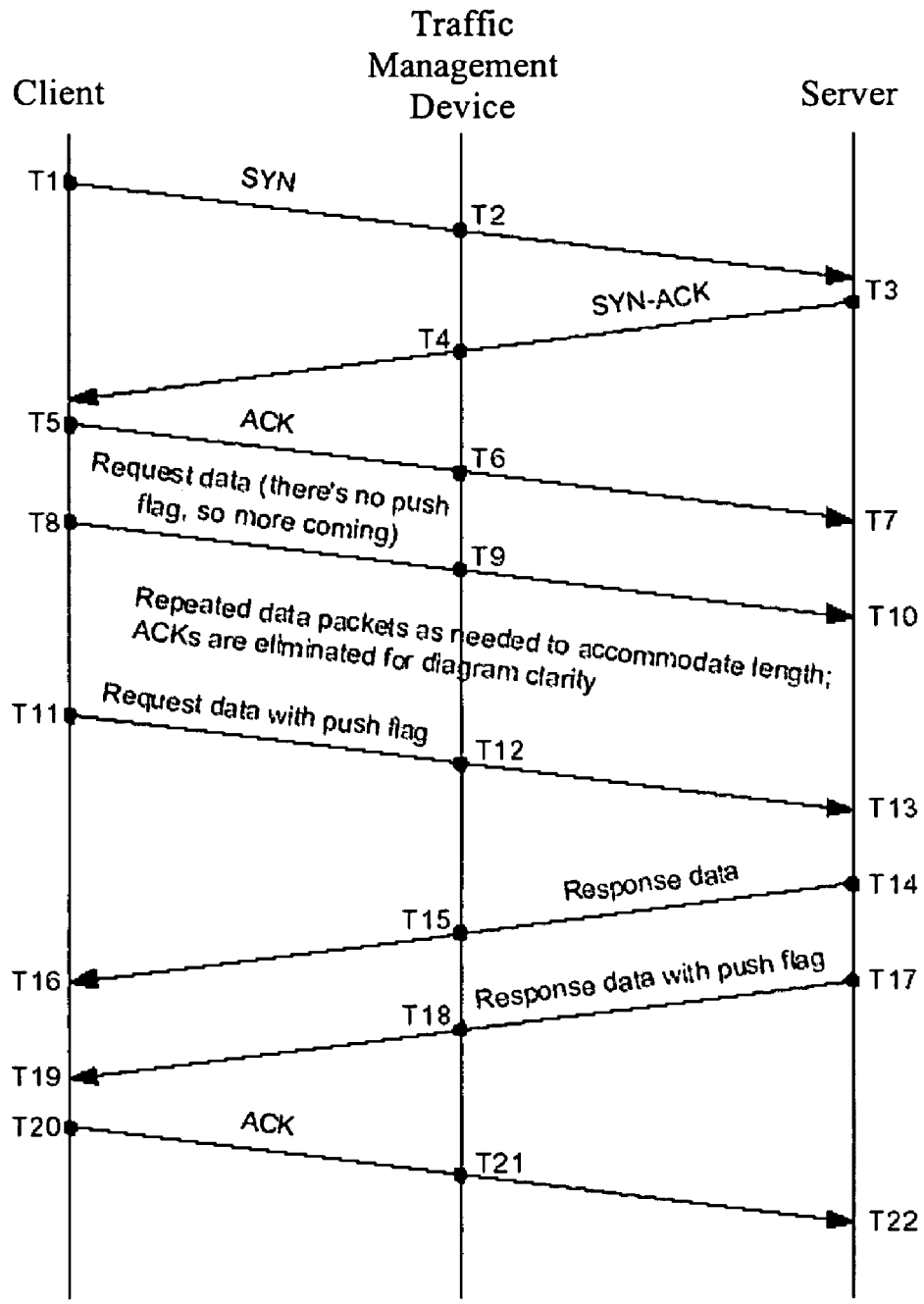
FIG. 5 is a TCP diagram illustrating the measurement of response times associated with TCP transactions.

FIGS. 1 and 2A illustrate a general network environment in which an embodiment of the present invention operates. As discussed above, FIG. 1 illustrates, for didactic purposes, a differentiated services network 50, such as an MPLS network, interconnecting a first enterprise network 40, such as a central operating or headquarters facility, and a second enterprise network 40a, such as a branch office facility. As FIG. 2A shows, network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 computer network 50 is a packet-based communications environment, employing TCP/IP protocols, and/or other suitable protocols, and has a plurality of interconnected digital packet transmission stations or routing nodes. Network 40 can be a local area network, a wide area network, or any other suitable network.

Differentiated services network 50, in one implementation, is a packet-based network comprising a plurality of routing nodes that support a plurality of differentiated service classes. A service class, in one implementation, defines one or more characteristics of packet transmission in one direction across a set of one or more paths within differentiated services network. These characteristics may be specified in quantitative or statistical terms of throughput, delay, jitter, and/or loss, or may otherwise be specified in terms of some relative priority of access to network resources. These characteristics may also be defined in relation to routes or paths within a network. In one implementation, differentiated services network 50 operates by applying different per-hop behaviors to aggregates of network traffic that have been marked or tagged in some fashion. A per-hop behavior (PHB) is a description of the externally observable forwarding behavior of a routing node applied to a particular service class or group of service classes. PHBs may be specified in terms of their resource (e.g., buffer, bandwidth) priority relative to other PHBs, or in terms of their relative observable traffic characteristics (e.g., delay, loss). Per-hop behaviors, in one implementation, are defined to provide a means of allocating buffer and bandwidth resources among competing traffic streams at each routing node in the differentiated services network 50. Differentiated services network 50 can employ one to a plurality of differentiated network services technologies, such as diffserv (see, e.g., RFC 2475, Blake et al. "An Architecture for Differentiated Services"), relative priority marking, service marking, label switching, Integrated Services/RSVP, and static per-hop classification. Examples of suitable label switching (or virtual circuit) technologies include Frame Relay, ATM, and MPLS [FRELAY, ATM]. Accordingly, traffic management device 130 can determine which differentiated service class applies to outbound data flows by marking outbound packets with appropriate codes, labels, and/or tags.

As discussed more fully below, traffic management device 130 is operative to monitor the performance of one or more network applications and mark outbound data flows associated with the network applications for differentiated services across differentiated services network 50 depending on the performance attributes of the network applications. One implementation of the present invention can be used to reduce bandwidth cost, while maintaining acceptable application performance. For example, each service class typically has a corresponding price level. Accordingly, traffic management device 130, in one implementation, can be configured to mark or tag alt data flows for the least cost service class. When the performance of a given network application (or any defined class of traffic) drops below a threshold level, traffic management device 130 can begin to mark or tag the data flows associated with that application or traffic class for a higher, more expensive class of service. In one implementation, the network application is then downgraded to the default service class after a period of time, or when the performance of the service class is once again within acceptable levels.

In another implementation, traffic management device 130 can be configured to optimize the performance of one or more networked applications. For example, traffic management device 130, or another network device in the communications path, can be configured to mark or tag data flows according to a default differentiated service scheme, where high priority data flows receive higher classes of service. Simply designating higher priority traffic for higher service classes, however, may not result in higher performance. The diffserv architecture offers limited service guarantees in the form of service classes. Data flows assigned to higher service classes usually experience lighter network load than data flows assigned to a lower class. However, there are no guarantees for the service quality. Thus, at certain times load for a given service class may be so high that the performance of an application using that service class can be less than satisfactory. Accordingly, traffic management device 130 can be configured to select an alternate service class for a given network application, if performance under the existing service class falls below a given threshold.

As the Figures illustrate, a variety of deployment configurations are possible. FIG. 2B shows a first network device 41 (such as a hub, switch, router, and/or a variety of combinations of such devices implementing a LAN or WAN) interconnecting two end-systems (here, client computer 42 and server 44). As FIGS. 2A and 2B illustrate, traffic management device 130 is provided between router 22 and network 40. In implementations, where differentiated services network 50 employs tags, such as MPLS tags, to aggregate network traffic into service classes, router 22 must be configured to recognize these tags. Alternatively, in other implementations, traffic management device 130 may be disposed in the communication path between access link 21 and router 22. In such a deployment, traffic management device 130 may add appropriate tags to outbound packets after they are emitted from the egress interface of router 22.

Other configurations are possible. For example, FIG. 2C illustrates another computer network environment in which implementations of the present invention can operate. As FIG. 2C shows, first and second access links 21a, 21b interconnect network 40 and network 52. Router 23, in one implementation, is operative to select either access link 21a or 21b depending on the state of the markings or tags associated with each packet. Network 52 may be any suitable network, such as an Internet Service Provider network, which may or may not be a differentiated services capable domain. In addition, since the marking or tagging of data flows only affects outbound data flows, in certain implementations, the deployment of traffic management devices 130, 130a (as FIG. 1 illustrates) at strategic locations in the communications path between networks 40, 40a can operate on data flows in both directions between respective hosts associated with those networks. As discussed more fully below, one implementation of the present invention features functionality to coordinate the operation of traffic management devices 130, 130a.

The functionality of traffic management device 130 can be integrated into a variety of network devices that are typically located at strategic points in computer networks, such as firewalls, routers, gateways, proxies, packet capture devices and bandwidth management devices. As FIGS. 1 and 2A show, the traffic management device 130, in one embodiment, is disposed on the communication path between network 40 and router 22. In other embodiments, multiple traffic management devices can be disposed at strategic points in a given network infrastructure to achieve various objectives. For example, the traffic monitoring functionality described herein may be deployed in multiple network devices and used in redundant network topologies by integrating the network traffic synchronization functionality described in U.S. application Ser. No. 10/611,573, incorporated by reference above.

A. Application-Aware, Adaptive Selection of Differentiated Services

As discussed above, traffic management device 130 is operative to monitor the performance of one or more network applications in relation to one or more attributes of the data flows traversing access link 21, and selectively mark or tag the data flows for a given service class depending on the monitored performance. As FIG. 2B illustrates, traffic management device 130, in one implementation, comprises traffic management module 75, and first and second network interfaces 71, 72, which operably connect traffic management device 130 to the communications path between first network device 41 and second network device 22. Traffic management module 75 generally refers to the functionality implemented by traffic management device 130. In one embodiment, traffic monitoring module 75 is a combination of hardware and software, such as a central processing unit, memory, a system bus, an operating system and one or more software modules implementing the functionality described herein.

In one embodiment, first and second network interfaces 71, 72 are implemented as a combination of hardware and software, such as network interface cards and associated software drivers. In addition, the first and second network interfaces 71, 72 can be wired network interfaces, such as Ethernet interfaces, and/or wireless network interfaces, such as 802.11, BlueTooth, satellite-based interfaces, and the like. As FIG. 1 illustrates, traffic management device 130, in one embodiment, includes persistent memory 76, such as a hard disk drive or other suitable memory device, such writable CD, DVD, or tape drives.

As FIG. 3 illustrates, traffic management module 75, in one implementation, includes a packet processor 82, a traffic classification database 86, a traffic policy module 84, and a traffic monitoring module 88. In one embodiment, the packet processor 82 is operative to process data packets, such as storing packets in a buffer structure, detecting new data flows, and parsing the data packets for various attributes (such as source and destination addresses, and the like) and maintaining one or more measurement variables or statistics in connection with the flows. The traffic classification database 86, as discussed more fully below, is operative to classify data flows based on one or more attributes associated with the data flows. Traffic classification database 86, in one implementation, stores traffic classes associated with data flows encountered during operation of traffic management device 130, as well as manually created traffic classes configured by a network administrator, in a hierarchical traffic class structure. In one embodiment, traffic classification database 86 stores traffic classes, in association with pointers to traffic management policies or pointers to data structures defining such traffic management policies. Traffic policy module 84 is operative to apply one or more traffic management policies to data flows traversing traffic management device 130. In one implementation, traffic policy module 84 is operative to mark or tag the packets (or alter existing markings or tags) associated with a given data flow for a given service class supported by differentiated service network 50. Traffic monitoring module 88, as described more fully below, is operative to monitor the performance of network 50 relative to one or more traffic classes. For example, traffic monitoring module 88 can be configured to monitor the performance of a given network application, such as Citrix®, Oracle®, and the like in relation to one or more performance attributes. As discussed in more detail below, the performance of a given network application or the overall network, as computed by traffic monitoring module 88, can be used to determine how data flows associated with the network application are marked or tagged.

In one implementation, traffic management module 75 further comprises measurement engine 140, management information base (MIB) 138, and administrator interface 150. Management information base 138 is a database of standard and extended network objects related to the operation of traffic management device 130. Measurement engine 140 maintains measurement data relating to operation of traffic management device 130 to allow for monitoring of bandwidth utilization and network performance across access link 21 with respect to a plurality of bandwidth utilization and other network statistics on an aggregate and/or per-traffic-class level.

Administrator interface 150 facilitates the configuration of traffic management device 130 to adjust or change operational and configuration parameters associated with the device. For example, administrator interface 150 allows administrators to select identified traffic classes and associate them with traffic management policies. For example, administrator interface 150 allows a network administrator to define one or more service classes supported by differentiated services network 50 and supply the labels, codes, tags or other information required to designate packets to receive a given class of network service. Administrator interface 150 also allows a network administrator to select a given traffic class corresponding to a network application and specify a traffic management policy that causes traffic management device 130 to mark data flows associated with that traffic class for a higher service class when the performance of that application degrades below a configured threshold. Administrator interface 150 also displays various views associated with a hierarchical traffic classification scheme and allows administrators to configure or revise the hierarchical traffic classification scheme. Administrator interface 150 can be a command line interface or a graphical user interface accessible, for example, through a conventional browser on client device 42.

A.1. Packet Processing

In one embodiment, when packet processor 82 encounters a new data flow it stores the source and destination IP addresses contained in the packet headers in host database 134. Packet processor 82 further constructs a control block (flow) object including attributes characterizing a specific flow between two end systems. In one embodiment, packet processor 82 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Other flow attributes may include application specific attributes gleaned from layers above the TCP layer, such as codec identifiers for Voice over IP calls, Citrix Application Session identifiers, and the like. Packet processor 82, in one embodiment, reserves memory space in the dynamic memory pool for storing such variably-sized attribute information as flows traverse traffic management device 130. Packet processor 82 also stores received packets in a buffer structure for processing. In one embodiment, the packets are stored in the buffer structure with a wrapper including various information fields, such as the time the packet was received, the packet flow direction (inbound or outbound), and a pointer to the control block object corresponding to the flow of which the packet is a part.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. FIG. 2A illustrates the concept associated with inside and outside addresses. As discussed above, in one embodiment, a flow specification object includes an "inside" and "outside" address relative to traffic management device 130. See FIG. 2A. For a TCP/IP packet, packet processor 82 can compute the inside and outside addresses based on the source and destination network addresses of the packet and the direction of the packet flow.

In one embodiment, packet processor 82 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, packet count, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 82 hashes the values identified above and scans the hash table for a matching entry. If one exists, packet processor 82 associates the pointer to the corresponding control block object with the data flow.

To allow for identification of service types (e.g., FTP, HTTP, etc.), packet processor 82, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When traffic management device 130 encounters a new flow, packet processor 82 analyzes the data flow against the service attributes in the services table to identify a service ID corresponding to the flow. In one embodiment, packet processor 82 may identify more than one service ID associated with the flow. In this instance, packet processor 82 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor 82 associates the flow with the most specific service ID. A traffic class maintained by traffic classification database 86 may be configured to include matching rules based on the service IDs in the services table. For example, a matching rule directed to HTTP traffic may simply refer to the corresponding service ID, as opposed to the individual attributes that packet processor 82 uses to initially identify the service.

In one embodiment, when packet processor 82 inspects a flow it may detect information relating to a second, subsequent flow (e.g., an initial FTP command connection being the harbinger of a subsequent data connection, etc.). Packet processor 82, in response to such flows populates a remembrance table with attributes gleaned from the first flow, such as IP addresses of the connection end points, port numbers, and the like. Packet processor 82 scans attributes of subsequent flows against the remembrance table to potentially associate the subsequent flow with the first flow and to assist in identification of the second flow.

A.2. Traffic Classification

A traffic class comprises a set of matching rules or attributes allowing for logical grouping of data flows that share the same characteristic or set of characteristics—e.g., a service ID or type (see Section A.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, traffic management device 130 includes functionality allowing for classification of network traffic based on information from layers 2 to 7 of the OSI reference model. Traffic management device 130 can be configured to include matching rules that define a plurality of network applications commonly found in enterprise networks, such as database applications, Citrix® flows, ERP applications, and the like.

In one embodiment, traffic management device 130 is configured to include a predefined set of traffic classes based upon a knowledge base gleaned from observation of common or known traffic types on current networks. Traffic management device 130, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification database 86 also stores traffic classes added by the traffic discovery module. Furthermore, as discussed below, traffic management device 130 may also include traffic class discovery functionality that automatically adds traffic classes to traffic classification database 86 in response to data flows traversing the device.

Traffic classification database 86, in one implementation, stores traffic classes associated with data flows that traverse access link 21. Traffic classification database 86, in one embodiment, stores the traffic classes and corresponding data (e.g., matching rules, policies, partition pointers, etc.) related to each traffic class in a hierarchical tree. This tree is organized to show parent-child retationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/Default". In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Traffic management device 130 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification database 86 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

A.2.a. Automatic Traffic Classification

As discussed above, a traffic discovery module (not shown), in one implementation, analyzes data flows for which no matching traffic class was found in traffic classification database 86. The traffic discovery module, in one embodiment, is operative to apply predefined sets of matching rules to identify a traffic class corresponding to non-matching data flows. In one implementation, traffic discovery module operates on data flows classified as either /Inbound/Default or Outbound/Default. In one embodiment, the traffic discovery module is configured to include a predefined set of traffic classes based upon a knowledge base gleaned from observation of common or known traffic types on current networks. In one embodiment, the traffic discovery module creates traffic classes automatically in response to data flows traversing traffic management device 130 and stores such traffic classes in traffic classification database 86. Automatic traffic classification is disclosed in U.S. Pat. Nos. 6,412,000, 6,457,051, and 6,591,299, which are incorporated herein by reference.

As discussed above, the traffic discovery module applies one or more traffic discovery thresholds when deciding whether to present or add newly discovered traffic classes. In one embodiment, the traffic discovery module must detect a minimum number of data flows within a predefined period for a given traffic type before it creates a traffic class in traffic classification database 86. In one embodiment, auto-discovered traffic classes are automatically assigned predefined traffic management policies. U.S. patent application Ser. No. 09/198,051, incorporated by reference herein, discloses automatic assignment of traffic policies for discovered traffic classes.

A.3. Application of Traffic Management Policies to Data Flows

As discussed above, traffic policy module 84 applies the traffic policies identified in the control block object corresponding to various flows. As discussed above, certain traffic policies can be differentiated network service policies, such as selection of certain MPLS tags, diffserv codes, and the like. Accordingly, in one implementation, traffic policy module 84 is operative to add the required markings or tags to the packets in the data flow as required by the differentiated services technologies or protocols employed by differentiated services network 50. In one implementation, to support the implementation of the differentiated services policies described herein, a table or other data structure stores network service class identifiers in association with the tags, labels, codes or other information required to designate packets for the given class of service. Traffic policy module 84, in one implementation, consults this data structure after obtaining the service class identifier from the control block object to retrieve the information required to appropriately mark the packets. In some implementations, traffic policy module 84 may also apply other traffic policies or controls, such as bandwidth utilization controls, security policies and the like.

For example, traffic policy module 84, in one implementation, is operative to enforce bandwidth utilization controls, in addition to or in lieu of differentiated services policies, on data flows traversing access link 21. A bandwidth utilization control for a particular data flow can comprise an aggregate control bandwidth utilization control, a per-flow bandwidth utilization control, or a combination of the two. Traffic policy module 84 can use any suitable functionality to enforce bandwidth utilization controls known in the art, including, but not limited to weighted fair queuing, class-based weighted fair queuing, Committed Access Rate (CAR) and "leaky bucket" techniques. Traffic policy module 84 may incorporate any or a subset of the TCP rate control functionality described in the cross-referenced U.S. patents and/or patent applications set forth above for controlling the rate of data flows. Bandwidth management device 130, however, can also be configured to implement a variety of different policy types, such as security policies, admission control policies, redirection policies, caching policies, transcoding policies, and network address translation (NAT) policies. Of course, one of ordinary skill in the art will recognize that other policy types can be incorporated into embodiments of the present invention.

A.3.a. Aggregate Bandwidth Utilization Control

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solution for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

A.3.b. Per-Flow Bandwidth Utilization Controls

Traffic policy module 84 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, traffic policy module 84 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes traffic policy module 84 to discard or drop data packets or flows associated with a particular traffic class. Other policy types include redirection policies where an inbound request designating a particular resource, for example, is redirected to another server.

A.4. Measurement Engine and Management Information Base

As discussed above, measurement engine 140 maintains data associated with the operation of traffic management device 130 and the computer network environment, including data allowing for measurement of bandwidth utilization across access link 21 with respect to a plurality of bandwidth utilization and other network statistics. The information obtained by these modules may be used in the analysis of network application performance, discussed below. In one implementation, measurement engine 140 is operative to record or maintain numeric totals of a particular measurement variable at periodic intervals on a traffic classification basis. For example, measurement engine 140 monitors the number of inbound and outbound packets, the number of flows, peak and average rates, as well as the number of bytes, traversing traffic management device 130 on an aggregate (access link), partition, and/or traffic class level. Other network statistics can include the number of TCP packets, the number of retransmitted TCP packets, the peak number of concurrently active TCP flows or other connections, etc. Measurement engine 140 also maintains data relating to operation of traffic management device 130, such as aggregate byte count, aggregate packet count, the TCP data packet count, the TCP retransmit packet count, the TCP tossed retransmit packet count, the peak number of active TCP flows. Measurement engine 140 can also maintain network statistics associated with the service classes supported by differentiated services network, such as aggregate byte count, aggregate packet count, the TCP data packet count, the TCP retransmit packet count, the TCP tossed retransmit packet count, the peak number of active TCP flows. Measurement engine 140 further maintains data relating to traffic classes, such as, for a given traffic class: the packet count in the traffic class, the TCP data packet count in the class, the TCP retransmit packet count in the class, and the peak number of active TCP flows in the class, as well as a "class hits" count characterizing the number of flows that were matched to a given traffic class. Of course, measurement engine 140 can be configured to record and maintain a variety of network utilization and performance related data.

In one embodiment, measurement engine 140 monitors operation of traffic management device 130 and maintains values (e.g., packet counts, peak bandwidth utilization values, and other quantities) for various network operation, utilization and performance statistics. In one embodiment, measurement engine 140 maintains such values in volatile memory and, at periodic intervals, stores the data in persistent memory, such as a hard drive, with a time stamp and clears the network statistic values in the volatile memory space. As discussed above, network statistic data can be stored in association with identifiers for access link 21, as well as for various traffic classes associated with the current configuration of traffic management device 130. In one embodiment, measurement engine 140 stores network statistic data in persistent memory at one-minute intervals; however, other suitable time intervals can be chosen as a matter of engineering design or administrative need. In addition, the persistent memory, in one embodiment, includes sufficient capacity to store a large amount of network management data, such as data for a period of 24, 48, or 72 hours.

In one embodiment, the time interval at which measurement engine 140 stores network management data in persistent memory is a configurable parameter. Additionally, measurement engine 140 includes APIs allowing other modules to access the raw measurement data. In one embodiment, measurement engine 140 includes APIs and associated functionality that aggregates raw measurement data over specified time intervals (e.g., the last hour, 15 minutes, day, etc.).

Management information base 138 maintains a database of standard and extended network objects maintaining counts and other statistics relating to the operation of bandwidth management device 30. In one embodiment, the data maintained by management information base 138 can be extracted using Simple Network Management Protocol (SNMP) queries. In one embodiment, management information base 138 is maintained in dynamic memory, such as Random Access Memory. For example, the management information base 138 maintains counts related to the operation of the inside and outside network interfaces associated with the bandwidth management device 30, such as the number of bytes transmitted from an interface, the number of bytes received on an interface, the number of queued packets, transmission error counts, etc. Management information base 138 also maintains counts related to the operation of different modules (e.g., packet processor 82, traffic policy module 84, etc.) included in traffic management device 130.

A.5. Monitoring Network or Application Performance

As discussed above, application traffic monitoring module 88 is operative to monitor the packet path in the inbound and outbound directions to gather various measurement data and compute the performance of one or more selected traffic classes. In a typical configuration, the traffic classes for which performance is monitored generally correspond to network applications that an enterprise deems important or critical. In one implementation, application or network performance is determined relative to response times which is a primary indicator of a user's experience with a network application. In one implementation, application traffic monitoring module 88 is operative to provide performance related statistics like network delay, server delay, and congestion metrics for selected applications or other user-defined traffic classes, such as individual hosts, subnets, and for any transaction-oriented TCP traffic class. Application traffic monitoring module 88 can break down the total observed delay, for each response-time measurement into network delay (time spent in transit) and server delay (time the server used to process the request). The location of traffic management device 130 at strategic points in a given network environment—monitoring all the traffic that passes—facilitates the accurate determination of response times. That is, because traffic management device 130 encounters all data flows transmitted to and from network 40, it can readily calculate the time network traffic spends traveling between a client and a server, the time used by the server, and the time spent on either side of traffic management device 130 itself.

Application traffic monitoring module 88, in one implementation, can make the following measurements or response time determinations:

1) total delay: The total time (in milliseconds) a transaction requires, beginning with a client's request and ending upon receipt of the response, corresponding to the end user's view of the time it takes for a transaction to complete.

2) network delay: The time (in milliseconds) spent in transit when a client and server exchange data. If a transaction requires a large quantity of data to be transferred, it is divided and sent in multiple packets. Network delay includes the transit time for all packets involved in a request-response transaction. The amount of time the server uses for processing a request is not included.

3) server delay: The time (in milliseconds) the server uses to process a client's request after it receives all required data. The server delay is the time after the server receives the last request packet and before it sends the first packet of response (not receipt acknowledgment, but actual response content). This is the time the server takes to process the client's request.

4) normalized network delay: The time (in milliseconds) per kilobyte spent in transit when a client and server exchange data. If a transaction requires a large quantity of data to be transferred, it is divided and sent in multiple packets. Because network delay increases as transaction size increases, it can be misleading when comparing times. Normalized network delay eliminates size as a factor to facilitate comparisons across flows and applications.

5) round trip time (RTT): The time (in milliseconds) spent in transit when a client and server exchange one small packet. Even if a transaction's data is split into multiple packets, RTT, includes only one round trip of a single packet between client and server.

6) Packet exchange time (PET): The time (in milliseconds) between a packet's departure from traffic management device and receipt of the corresponding acknowledgment. This metric reflects only the delay for the network on one side of traffic management device 130. U.S. application Ser. No. 09/710, 442 discloses methods and systems for monitoring network delay on an application-level basis attributable to different networks by monitoring data flows at a demarcation point between the two networks.

In one implementation, traffic management device 130 can be configured to initiate synthetic web or other TCP transactions at periodic intervals to verify the availability of critical hosts. This activity is similar to scheduled pings or SNMP polls, but has the added advantage of the functionality of application traffic monitoring module 88 being applied to analyze synthetic transaction behavior and response times, rendering the ability to profile network and host behavior over time.

A.5.a. Calculating Transit Delays

To compute the delay measurements discussed above, application traffic monitoring module 88 tracks the course of a client-server transaction, making various packet arrival time and size observations, and uses information about a TCP connection to differentiate one portion of the exchange from another in order to compute accurate performance statistics. FIG. 6 illustrates the typical components associated with a TCP connection. FIG. 6 is a standard TCP diagram showing the course of a network transaction over time. Arrows indicate packets traveling the network between client and server. Time increases as one descends the diagram, with successive event times noted as TN, T1 representing the first event and T22, the last.

As FIG. 6 illustrates, a client initiates a server connection with a SYN at time T1. Application traffic monitoring module 88 notes the SYN at time T2 and forwards it along to the server. The server responds with a SYN-ACK at time T3. Application traffic monitoring module 88 notes the SYN-ACK at time T4, passing it along as shown. TCP stacks usually respond with a SYN-ACK very rapidly, within the kernel and with no context switches. The SYN-ACK follows the SYN almost immediately. Therefore, time T4 minus time T1 results in an accurate measure of the round-trip network delay between traffic management device 130 and the server. This interchange produces the first quantity, the server transit delay (STD):

$$STD=T4-T2$$

The client receives the SYN-ACK and issues the final ACK of the three-way handshake at time T5. Application traffic monitoring module 88 notes the ACK at time T6, passing it along to the server. In one implementation, it is reasonably assumed that no processing transpires between the client's receipt of the SYN-ACK and its own corresponding ACK at time T5. Time T6 minus time T4 yields an accurate measure of the round-trip network delay between the client and traffic management device 130. The client transit delay (CTD):

$$CTD=T6-T4$$

Putting together the server transit delay (STD) and the client transit delay (CTD) yields the total delay between the client and the server for a single round trip.

$$RTT(\text{Round-Trip Time})=STD+CTD$$

A.5.b. Determining the Server Delay

The client initiates its request at time T8, arriving at the traffic management device 130 at time T9. For large requests, the request is divided into multiple packets. The TCP diagram of FIG. 6 eliminates the server's corresponding ACKs to simplify the picture, because these ACKs are not material to the calculations described herein. The last request packet, sent at time T11, has its Push Flag set to one indicating it is the final packet. Traffic management device 130 notes the time of this last request packet at T12. After the last request packet arrives at the server at time T13, the server assembles the request, conducts whatever processing is required for the request, and assembles its response. The server sends the first packet (of potentially several response packets) at time T14.

Time T14 minus time T13 is the actual server-processing time required for the request, but these times are not visible to application traffic monitoring module 88. However, application traffic monitoring module 88 knows that the server's processing time occurred after it saw the last request packet and before it saw the first response packet (time T15 minus time T12). Additionally, it knows that another component of this interval was the transit time from traffic management device 130 to the server and back again. Conveniently, it already has that figure—i.e., the server transit delay (STD). In addition, there is a small amount of time spent serializing the bits in the response packet and preparing them for their bit stream. This time was not included in the original server transit delay because the SYN and ACK packets are extremely small. Application traffic monitoring module 88, in one implementation, knows the size of the packet, calculates this preparation time accordingly (□1), and adds it to the STD before subtracting the sum from the time difference. Therefore, Server Delay=(T15−T12)−(STD+α1)

A.5.c. Determining the Total Delay

The termination of a transaction is key to calculating the total delay; however, it is not always obvious when a transaction ends. The combination of a Push flag from the server and its corresponding ACK from the client frequently signal the end of a transaction. But long transactions often insert Push flags throughout the transaction. In addition to monitoring Push flags, application traffic monitoring module 88 uses a timer to track transactions and uses the following rules:

1) If a Push flag seems to indicate a transaction's end, but the server continues sending more data, the timer continues to advance.

2) If the client sends a new request, application traffic monitoring module 88 ends the last transaction and records the last time noted.

3) If there is no activity from either the server or the client, application traffic monitoring module 88 considers the transaction complete and records the last time noted.

4) When the connection ends, traffic management device 130 sees the FIN and records the last time noted.

Using these techniques, application traffic monitoring module 88 notes the last response packet at time T18, makes sure that it saw all required ACKs for the request packets, and verifies that the last response packet indeed represented the end of the transaction. After the client receives the final response packet at time T19, it sends an ACK. The ACK reaches traffic management device 130 at time T21. The client's perspective of response time starts with sending the first request packet (T8) and ends with receipt of the final response packet (T20). Application traffic monitoring module 88 sees that interval as time T9 to time T21. Although this is a close estimate of the client's view, it misses some extra preparation time for serializing the first request packet, assuming it is larger than the final ACK. Because application traffic monitoring module 88 knows the packet-size difference, however, it can calculate this small discrepancy (Δ2). Therefore, Total delay=(T21−T9)+Δ2

A.5.d. Determining Network Delay

Once application traffic monitoring module 88 computes the server delay and the total delay, it can calculate the amount of time the transaction spent in transit.

Network delay=(Total delay)−(Server delay)

Whereas the RTT represents the transit time for just one round trip, the network delay reflects all transit time for the transaction. If the transaction's data is large, multiple packets need to make their way to and from the server. Only the network delay reflects this overhead. The network delay is not necessarily an even multiple of the RTT because multiple packets are not sent consecutively but tend to overlap to varying degrees. In addition, because network and total delay are products of transaction size, ping times and RTM measurements are not comparable.

A.5.e. Aggregation and Analysis of Response Time Measurements

Application traffic monitoring module 88, in one implementation, collects packet arrival time observations and sizes and computes response time measurements for the data flows and stores the computed measurement values in one process. A separate process accesses the stored values to analyze the performance of one or more network applications in relation to one or more performance thresholds. Depending on the results of the analysis, this process can result in changes to the differentiated service policies applied to a given network application or other traffic class. Application traffic monitoring module 88, in one implementation, collects response time measurements associated with given traffic class identifiers, maintains the data in volatile memory for a given time interval (e.g., 1 minute), and then stores the data in non-volatile memory (similar to measurement engine 140). In another implementation, measurement engine 140 can be configured to store the relevant measurement variables. In another implementation, application traffic monitoring module 88 can average the response time measurements over the time interval and stores the average response time measurements for each traffic class. Application traffic monitoring module 88 further includes APIs and associated functionality that aggregates raw response time measurement data over specified time intervals (e.g., the last hour, 15 minutes, day, etc.) on a traffic class or network-wide basis. A separate process, using these APIs, can compute average response times over desired intervals and compare these response times to pre-configured performance thresholds.

Traffic management device 130, in one embodiment, features a plug-in architecture that facilitates, among other things, updates to application traffic monitoring module 88 (as well as other) functionality. A plug-in can contain data that extends and/or modifies one or more tables or data structures used by application traffic monitoring module 88 and/or updated code. Application traffic monitoring module 88, in one embodiment, uses a shared (dynamic link) library loader to add analysis plug-ins to an existing software release during a boot sequence. The shared library loader, in one embodiment, is operative to determine whether any plug-ins exist (e.g., by checking a directory or other reserved file space), and to extend/modify tables or other data structures and/or register specific code as required. This plug-in architecture can be used to extend or modify how traffic monitoring module 88 analyzes application performance and adjusts the differentiated services policies applied to various traffic classes.

In another embodiment, traffic management device 130 can be configured to include an embedded runtime environment (not shown) that is operative to execute application performance analysis scripts installed on traffic management device 130. Such an embodiment allows network administrators and others to create custom application performance analysis scripts tailored to a vast array of requirements, conditions and goals. In one embodiment, the embedded runtime environment is an object-oriented runtime environment, such as Python or Java®. The embedded runtime environment may be configured to include a runtime interpreter that interprets and executes scripts in source code form. In another embodiment, the embedded runtime environment may be configured to execute compiled application performance analysis scripts. In one such embodiment, the embedded runtime environment may include just-in-time compiler functionality to compile source code scripts into object or byte code form before execution. As discussed more fully below, traffic management device 130 stores one or more application performance analysis scripts operative to determine whether the performance of a given network application or other traffic class complies with one or more threshold criterion. In one embodiment, application performance analysis scripts are implemented as application performance analysis objects, which are instantiations of application performance analysis classes. In one embodiment, application performance analysis objects can be instantiated for each traffic management device 130 and maintained such that the state of the application performance analysis object can be pickled after execution to allow for certain data related to application performance analysis to persist. U.S. application Ser. No. 10/178,617, incorporated by reference herein, discloses the incorporation of embedded runtime environments into bandwidth management devices and the pickling of objects to persist data and variables.

In the following sections, a didactic example of a script is provided that analyzes the performance of a given traffic class and upgrades the service class corresponding to that traffic class if the measured performance falls below a threshold value. In one embodiment, administrator interface 150 allows network administrators to configure a differentiated network services policy that specifies a default service class, as well as a performance threshold. When a network administrator selects this configuration option for a given traffic class, the corresponding traffic class identifier, the default service class and the performance threshold are added to a dynamic configuration file. The performance analysis script of other functionality accesses this configuration file to determine for which traffic classes performance measurements should be analyzed. As the script provided below indicates, if the analyzed performance falls below the specified threshold for any given traffic class, the network service class for that traffic class is upgraded. In one embodiment, this is accomplished by overwriting the current network services class policy in traffic classification database 86 to an upgraded service class. Accordingly, as discussed above, when traffic management device 130 encounters subsequent data flows associated with that traffic class, the upgraded service class policy will be written into the control block object corresponding to the flow and, therefore, will be ultimately applied to the data flow. In addition, once network service for a given traffic class is upgraded, a separate process or analysis script, in one implementation, operates to determine when to downgrade the traffic class to its default differentiated service class.

A variety of implementations are possible. In one implementation, a traffic class is downgraded after some configured period of time after it was initially upgraded. For example, a traffic class may be upgraded and automatically downgraded after an hour (or other configurable period). If performance of that traffic class falls below the threshold, it will again be upgraded upon a subsequent operation of the performance analysis functionality discussed above. In one implementation, traffic management device 130 uses synthetic transactions to determine when a given traffic class should be downgraded. For example, by identifying one or more outside hosts associated with a given traffic class, traffic management device 130 can test performance of the network to these hosts using the default service class associated with the traffic class. If the PET performance associated with the synthetic transactions on the default (or lower service value) is less than a threshold value, the traffic class is downgraded to its default service level. In another implementation, application traffic monitoring module 88 analyzes the performance of non-upgraded flows that are still running over the lower, default service class. This can be accomplished by looking at the aggregate performance of all traffic and noting a statistically significant change from a baseline that was established at the time of upgrade. In another implementation, all data flows falling under a parent traffic class in the configuration hierarchy can be examined to determine when to downgrade a given traffic class. For instance, if a parent traffic class represented all traffic from the edge of network 40 to a given remote site, such as a data center (which excludes general Internet traffic), then application traffic monitoring module 88 can analyze the performance of other, non-upgraded child traffic classes of the parent traffic class to which the upgraded traffic class belongs.

A.5.f. Exemplary Implementation of Performance Analysis Scripts

As discussed above, in one implementation, the performance analysis scripts are executed by an object-oriented runtime environment. The embedded runtime environment, in one implementation supports "pickling," so that the various modules (set forth below) can maintain state information.

A.5.f.1. Strategy Module

Since there are different strategies and even different time intervals that one could adopt for upgrading and downgrading the path for a traffic class, one implementation of the present invention encapsulates those strategies in a class, which can then be subclassed in various ways without changing the main program. The main program, in one implementation, simply calls the "considerUpgrade" or "considerDowngrade" method, without having to know what strategy is in place for that traffic class. This is a standard object-oriented programming technique, and it allows for different traffic classes to have different strategies, and for the network administrator or other user to create custom strategies as well.

The following provides an example for the "abstract class" (or "superclass") for ClassEval:

```
class ClassEval:
    """ The superclass. These are null implementations;
    """ Subclasses fill in the details.
    """

def _init_(self, className):
        self.className = className
        pass
    def considerUpgrade(self, cl):
        """ Since 'cl' is a PacketWiseObject, which is only
            meaningful at runtime, it cannot be pickled. There-
            fore, it is passed in as an argument, and the ClassEval
            must NOT save it as an instance variable (otherwise
            the pickling machinery tries to process it)
        """
        return None
    def considerDowngrade(self, cl):
        """ See comments for considerUpgrade.
        """
        return None
```

The following is a version of ClassEval, which measures the 'pkt-exch-time' (PET), see above, for a traffic class against a threshold ("if cl.ME.pkt_exch_time.last_15_minutes>self.threshold"). Note that any performance-related variable or combination of variables, and any supported time interval, could be used here, besides 'pkt-exch-time' and 'last-15-minutes.' As the following script provides, ClassEval, in one implementation, is configured with 1) 'evalTime', which is the normal time interval at which to consider upgrading; 2) 'downgradeTime', the time interval at which to consider downgrading the class; and 3) 'upgradeReEvalTime'—if a class was downgraded, this parameter specifies the time interval at which to reexamine performance, which could be sooner than "evalTime."

```
import ClassEval
import time
class ClassEvalSimple(ClassEval.ClassEval):
    """ This eval class tests pkt_exch_time over the DS net-
        work for the last 15 minutes, against a fixed threshold.
    """
    def _init_(self, name, threshold, evalTime, upgradeRe-
            EvalTime, downgradeWaitTime):
        ClassEval.ClassEval._init_(self, name)
        self.threshold = threshold
        self.evalTime = evalTime
        self.upgradeReEvalTime = upgradeReEvalTime
```

```
        self.downgradeWaitTime = downgradeWaitTime
        self.timeDowngraded = 0
        self.timeLastEval = 0
    def evalThreshold(self, cl):
        now = time.time( )
        self.timeLastEval = now
        if cl.ME.pkt_exch_time.last__15_minutes > self.thresh-
            old:
            self.timeUpgraded = now
            return 1
        return None
    def considerUpgrade(self, cl):
        """ Rules:
        1) if already downgraded this one again, then recheck its
            performance sooner than we otherwise would.
        2) if not, then check it at the regular interval
        """
        now = time.time( )
        if self.downgradeTime > 0:
            if now − self.timeDowngraded > self.upgradeReEval-
                Time:
                return self.evalThreshold(cl)
        if now − self.timeLastEval > self.evalTime:
            return self.evalThreshold(cl)
        return None
    def considerDowngrade(self, cl):
        """ In this version, try downgrading every configured
        interval.
        """
        now = time.time( )
        if now − self.timeUpgraded > self.downgradeWaitTime:
            return 1
        return None
```

Other implementations are possible. In one implementation, the considerDowngrade method could be configured to check whether application performance actually improved. If application performance did not improve, the considerDowngrade method could simply reverse the upgrade for that traffic class. Note that the methods called by the main module, in the implementation shown, all have a 'cl' argument; this is an example of the concern that C or other native code objects not be exposed to the pickling mechanism implemented by the runtime environment. The class never saves that 'cl' as an instance variable 'self.cl'.

In addition, more complex schemes can be accommodated within the framework set forth above. For example, the strategy module can be configured to learn from historical events. For example, the strategy module can, in one implementation, be configured to measure the performance of synthetic transactions on a separate traffic class, which is assumed to be permanently on the default or lowest service class. This can be used to judge, relative to "good" and "bad" threshold values, whether downgrading an application would be likely to result in acceptable performance. (For the pkt-exch-time variable, "good" is a small number, and "bad" is a large number.) Whenever an application is successfully downgraded (meaning, it no longer requires upgrading), the "good" level of synthetic transaction performance is recorded.

The strategy module, in one implementation, can also implement a certain amount of hysteresis, since frequent changes to the service class applied to a given application may be undesirable. Therefore, in one implementation, the strategy module is configured to raise the "good" threshold slowly, similar to TCP slow-start. When an application is unsuccessfully downgraded, the "bad" level is also recorded and used as the "bad" threshold value. The strategy module does not attempt to downgrade a given traffic class if the observed performance of the synthetic transactions is not better than the recorded "bad" level.

For didactic purposes, assume the following example. In the past, a synthetic transaction PET level of 150 has generally indicated acceptable performance levels for a given service class. In the more recent past, however, a "good" threshold level of 250 has resulted in acceptable application performance after being downgraded. However, at that point a downgrade ultimately fails. Again, like a TCP slow start, strategy module drops the "good" threshold level back down to a more conservative one, synthPreviousGoodLevel. This level will never rise beyond that of the first successful upgrade. Thus, over time, a reasonably narrow interval of synthetic transaction performance is learned. The following script provides an exemplary implementation of the foregoing scheme.

```
    import PacketWiseObject
    import ClassEval
    import time
    import sys
    class ClassEvalSynth(ClassEval.ClassEval):
        """ This eval class tests pkt_exch_time for the last 15
        minutes, against a fixed threshold. It also uses a special
        traffic class whose policy is ALWAYS the 'normal' link,
        presumed to be firing synthetic transactions at the rel-
        evant app. This is used to assess when a downgrade
        would be likely to succeed.
        The strategy for downgrading based on synthetic transac-
            tion performance is analogous to TCP slow-start:
            LOWER the threshold readily, but RAISE it only gradu-
            ally.
        """
        def _init_(self, name, threshold, evalTime, upgradeRe-
            EvalTime, downgradeWaitTime, synthClassName):
            ClassEval.ClassEval._init_(self, name)
            self.threshold = threshold
            self.evalTime = evalTime
            self.upgradeReEvalTime = upgradeReEvalTime
            self.downgradeWaitTime = downgradeWaitTime
            self.timeDowngraded = 0
            self.timeUpgraded = 0
            self.timeLastEval = 0
            self.synthClassName = synthClassName
            # the variables used for "slow-raise"
            self.synthGoodLevel = 0
            self.synthTestLevel = 0
            self.synthPreviousGoodLevel = 0
            self.synthPreviousBadLevel = sys.maxint
        def evalThreshold(self, cl):
            now = time.time( )
            self.timeLastEval = now
            if cl.ME.pkt_exch_time.last__15_minutes > self.thresh-
                old:
                self.timeUpgraded = now
                self.timeDowngraded = 0
                return 1
            return None
        def considerUpgrade(self, cl):
            """ Rules:
            1) if we already downgraded this one again, then we
                want to recheck its performance sooner than we oth-
                erwise would.
            2) if not, then check it at the regular interval
            """
            now = time.time( )
            if self.timeDowngraded > 0: # we downgraded him
                if now − self.downgradeWaitTime > self.upgradeRe-
                    EvalTime:
                    doUpgrade = self.evalThreshold(cl)
                    if doUpgrade:
                        downgradeWorked = 0
```

```
            else:
                downgradeWorked = 1
            self.recomputeSynthLevels(cl,         downgrade-
                Worked)
            return doUpgrade
    if now – self.timeLastEval > self.evalTime:
        doUpgrade = self.evalThreshold(cl)
        return doUpgrade
    return None
def recomputeSynthLevels(self, cl, downgradeWorked):
    """ given that we downgraded the app, and it either
        worked or didn't, reevaluate the levels at which we'll
        consider doing this in the future.
    """
    if downgradeWorked:
        if self.synthTestLevel > self.synthGoodLevel:
            if self.synthTestLevel > self.synthGoodLevel:
                if self.synthPreviousGoodLevel == 0:
                    # only do this once
                    self.synthPreviousGoodLevel  =  self.synth-
                        GoodLevel
                # move ¼ of the distance to the level we just
                # succeeded at, but
                # only if that's not a previously-bad level
                temp  =  self.synthGoodLevel  +  (self.synth-
                    TestLevel – self.synthGoodLevel)/4
                if temp < self.synthPreviousBadLevel:
                    self.synthGoodLevel = temp
    else: # downgrading didn't work
        if self.synthTestLevel < self.synthPreviousBadLevel:
            self.synthPreviousBadLevel = self.synthTestLevel
        if self.synthTestLevel < self.synthGoodLevel:
            self.synthGoodLevel  =  self.synthPrevious-
                GoodLevel
        self.synthPreviousGoodLevel = 0
def considerDowngrade(self, cl):
    """ In this version, we measure the performance of the
        synthetic transactions
        on the 'normal' link. If, in the past, we have successfully
        downgraded the app
        when conditions were 'similar' to this, we'll do it again.
    """
    now = time.time( )
    if now – self.timeUpgraded < self.downgradeWaitTime:
        return None
    clSynth = PacketWiseObject.TClassObject(self.synth-
        ClassName)
    current = clSynth.ME.pkt_exch_time.last_15_minutes
    if current < self.synthGoodLevel: # do it
        self.synthTestLevel = current
        self.timeDowngraded = now
        self.timeUpgraded = 0
        return 1
    elif current < self.synthPreviousBadLevel:
        self.synthTestLevel = current
        self.timeDowngraded = now
        self.timeUpgraded = 0
        return 1
    return None
```

One of ordinary skill in the art will immediately see that that many other algorithms are possible. For example, other performance-related variables, such as "tcp-efficiency %" (the ratio of non-retransmitted bytes to total bytes) in the synthetic transaction class could also be measured.

A.5.f.2. Budget Module

In another implementation, a budget module can be created to keep track of and implement a utilization budget for higher classes of differentiated network services. Since this would depend on the differentiated network services provider's billing plan, it is impossible to anticipate all variations. Accordingly, the script-oriented runtime environment according to one implementation allows network administrators or other end users to create their own budget class. In one implementation, the superclass for Budget is:

```
class Budget:
    """ The base class for an object which monitors the budget
        for a higher service class. Particular subclasses may
        work off the number of bytes transferred, the time that
        the DS class was used, or any other budgetary strategy
        that makes sense.
    """
    def _init_(self):
        pass
    def addFastClass(self, className):
        pass
    def removeFastClass(self, className):
        pass
    def update(self, criticalClasses):
        pass
    def allowMoreFastClasses(self):
        # return a 1 if more upgrades are permitted; 0 if not
        return 1
```

The following script provides an implementation of the budget class, where the "budget" is based on the number of bytes transferred per month. The BytesBudget object, in one implementation, maintains its own list of the upgraded traffic classes, so it can accurately count them only when they are actually upgraded, and not when they're downgraded. The variable 'cl.ME.bytes.this_month' is the aggregate number of bytes transmitted over the current month. In one implementation, this variable is maintained by measurement engine 140 for all traffic classes.

```
import Budget
from time import *
class BytesBudget(Budget.Budget):
    """ This class keeps a dictionary of every higher priority
        traffic class, and for each, its 'bytes.last_month' total the
        last time it was checked. It uses that to keep a global
        'bytesThisMonth' of all the bytes used by all higher
        priority traffic classes.
    """
    def _init_(self, bytesLimit):
        Budget.Budget._init_(self)
        self.bytesLimit = bytesLimit
        self.bytesThisMonth = 0
        self.fastClasses = { }
        self.month = localtime(time( )) [1]
    def addFastClass(self, className):
        self.fastClasses[className] = 0
    def removeFastClass(self, className):
        del self.fastClasses[className]
    def zeroNumbers(self):
        for className in self.fastClasses.keys( ):
            self.fastClasses[className] = 0
        self.bytesThisMonth = 0
    def update(self, criticalClasses):
        """ 'criticalClasses' is a way of passing the Packet-
            WiseObjects, which are runtime state and thus should
            not get pickled with this object.
        """
        # if the month's rolled over, zero everything:
        if localtime(time( )) [1] != self.month:
            zeroNumbers(self)
```

```
    for className in self.fastClasses.keys( ):
        cl = criticalClasses[className]
        newBytesThisMonth = cl.ME.bytes.this_month
        self.bytesThisMonth += newBytesThisMonth - self-
            .fastClasses[className]
        self.fastClasses[className] = newBytesThisMonth
def allowMoreFastClasses(self):
    # return a 1 if more upgrades are permitted; 0 if not
    if self.bytesThisMonth < self.bytesLimit:
        return 1
    return 0
```

A.5.f.3. Main Program

In one implementation, the scripts further include a main program module that periodically activates to call the considerUpgrade and considerDowngrade methods discussed above. The initialization call in such a main program, in one implementation, can look like the following:

```
def initialize(fileName, budgetObj, criticalClasses, dscp-
Fast, dscpNormal)
```

The variables in the initialization call mean:

fileName—the file where the state of the system is to be pickled budgetObj—a subclass of the Budget superclass criticalClasses—a Python "dictionary", where the "keys" are traffic class names, and the "values" are the strategy objects for that traffic class.

dscpFast and dscpNormal—the Differentiated Services Code Point numbers for the 'fast' and 'normal' paths.

Since the strategy and budget methods are encapsulated in separate objects, the main program can be fairly straightforward. For example, a method called by the main program to determine whether to upgrade the differentiated network service to critical or other selected traffic classes can be:

```
def considerUpgrades( ):
    """
    Test whether each given traffic class should be upgraded to
        the fast link. The tests are:
    1) are we over our budget limit for the month already? If so,
        go no further.
    2) otherwise, call the ClassEval object, which makes the
        actual decision
    """
    global criticalClasses
    global fastLinkClasses
    global stateFileName
    global budget
    budget.update(criticalClasses)
    if not budget.allowMoreFastClasses( ):
        return
    for className in criticalClasses.keys( ):
        # if already upgraded, go on to the next
        if fastLinkClasses.has_key(className):
            continue
        cl = criticalClasses[className]
        if cl.eval.considerUpgrade(cl):
            upgrade (cl)
            # remember we did this
            fastLinkClasses[cl.objName] = cl
            budget.addFastClass(className)
            writeState(stateFileName)
```

As the script above provides, the main program calls the 'budget' object to determine whether upgrades should be considered at all. If so, the main program considers all classes not already upgraded, and call their strategy objects ('cl.eval.considerUpdate'). The rest is just remembering what we did. The script above does not show operation on a periodic basis; rather it is assumed that the considerUpgrades object is called on some regular (user configurable) interval. In addition, each strategy module is responsible for determining when it wishes to consider upgrades or downgrades.

Furthermore, the following scripts actually implement the upgrades and downgrades according to an implementation of the present invention. In the implementation shown, the upgrade and downgrade scripts use the command line interface supported by administrator interface 150 to write the traffic management policies into the appropriate data structures. Of course other implementations are possible as well.

```
def upgrade(cl):
    # actually do the upgrade
    cmd = "policy dscp" + cl.objName + " " + str(state['dscp-
Fast'])
    ps_cmd.issueCmd(cmd)
    return None def downgrade(cl):
    # actually do the downgrade
    cmd = "policy dscp" + cl.objName + " " + str(state['dscp-
Normal'])
    return ps_cmd.issueCmd(cmd)
```

Note that "state" refers to a Python dictionary with one entry for each object to be pickled.

A.6. Operation

FIG. 4 illustrates a method, according to an embodiment of the present invention, directed to a flow-aware process that receives incoming flows, classifies them, and applies one or more traffic policies (such as a differentiated network service policy) based on the identified traffic class. As FIG. 4 illustrates, a packet processor 82 receives a data packet (202) and determines whether a flow object has already been created for the flow to which the data packet is a part (204). A flow object, in one implementation, is a data structure including fields whose values characterize various attributes of the flow, including source and destination IP addresses, port numbers, traffic class identifiers and the like. A flow object can also include other attributes, such as packet count, byte count, first packet time, last packet time, etc. If a flow object is not found, packet processor 82 constructs a new flow object (206). Packet processor 82 then determines whether the received packet is part of an existing flow or a new data flow (208). In typical network deployments, flows are generally TCP or UDP flows. However, any suitable transport layer flow can be recognized and detected. In one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 82 can determine a new data flow by detecting SYN and/or SYN/ACK packets. However, a new data flow can simply be a data flow for which there is no corresponding flow object. For example, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another implementation, a background and/or separate process can periodically compare the last packet times associated with a flow to a threshold period of time and deem the flow terminated if the last packet time is beyond the threshold period of time.

If the packet is part of an existing flow, the packet processor 82 associates the packet with the corresponding flow object and updates flow object attributes as required (210). For example, the packet processor 82, in one embodiment, increments the packet count associated with the flow, as well as the last packet time. If the packet represents a new data flow, traffic classification database 86 operates on the flow object and, potentially, attributes of the packet and other packets associated with the flow to determine a traffic type and/or traffic class associated with the flow (214). In one embodiment, the packet (or a pointer to the packet stored in a buffer structure) and the flow object (or a pointer thereto) is passed to the traffic classification database 86 to determine a traffic class. As discussed herein, identification of a traffic class or type can employ information gleaned from Layers 2 thru 7 of the OSI reference model. The determination of traffic classes is discussed in more detail at Sections A.1. and A.2., above. Similarly, if the packet represents a change to the data flow (212), packet processor 82 passes the packet and flow object to the traffic classification database 86 to determine the traffic class. Methods for determining changes to data flows are also well known in the art. For example, an email may include an attached digital image file. Accordingly, while the initial packets in the data flow may include simple text data, subsequent packets may contain image data. Packet processor 82, in one embodiment, is operative to detect such changes in the characteristics of the data flow by examining data encapsulated in upper layers of each packet, such as the detection of MIME types, etc.

As discussed above, to identify a traffic class associated with the data flow, packet processor 82 passes the flow object (or a pointer to the control block object) to traffic classification database 86. In one embodiment, the control block object or a copy of it is stored in association with the packet and in the same buffer structure to facilitate access to the control block object by traffic classification database 86. As discussed in more detail below, traffic classification database 86 operates on attributes of the flow object, (and potentially on the packet stored in the buffer structure) to identify traffic class(es) associated with the data flow (214). In one embodiment, the flow object includes a pointer to the identified traffic class(es) in traffic classification database 86. In one embodiment, the traffic classification database 86 stores in the flow object the differentiated service policy parameters, if any, associated with the identified traffic classes (216). As discussed above, the application performance analysis functionality discussed above monitors, in a separate process, the performance of network applications configured with a differentiated network service policy that allows for upgrades to network service if performance degrades below a specified threshold. Application traffic monitoring module 88 maintains the appropriate differentiated network services policy in traffic classification database 86, depending on the analyzed performance of the network application or other traffic class.

Packet processor 82 then passes the packet to traffic policy module 84 (222) which accesses the flow object corresponding to the data flow to retrieve differentiated service policies, if any, associated with the traffic class and enforces the identified traffic policy(ies) on the data packet flow. As FIG. 4 illustrates, measurement engine 140 also records or updates various measurement values associated with the packet to allow for analysis of bandwidth utilization and other network statistics on a traffic class or aggregate basis by traffic monitoring module 88.

As discussed above, traffic management device 130 can only effectively select differentiated services for outbound flows. However, as FIG. 1 illustrates, the use of first and second traffic management devices 130, 130*a* disposed at strategic points in the communication path between networks 40, 40*a* allow for the selection of differentiated network services in both the inbound and outbound directions for given network applications or other traffic classes. In one implementation, first and second traffic management devices 130, 130*a* may be configured to exchange application performance measurement data to coordinate the selection of differentiated network services for given network applications running between networks 40, 40*a*. In one implementation, traffic management devices 130, 130*a* are responsive to the differentiated service classes detected in inbound flows associated with a given traffic class from a given network, and adjust the service class applied to outbound flows of that traffic class to the same network. For example, as discussed above, traffic management devices 130, 130*a* can be configured with a hierarchical traffic classification configuration that includes a parent traffic class corresponding to networks 40*a* and 40, respectively, and child traffic classes of the parent class corresponding to different network applications or other traffic classes. FIG. 6 illustrates a method for coordinating the operation of traffic management devices 130, 130*a* given the traffic classification configuration set forth above. As FIG. 6 illustrates, after a traffic class is identified, application traffic monitoring module 88, in one implementation, can be configured to determine whether the packet represents an inbound flow from a known network (302). For example, traffic management device 130*a* can be configured to recognize inbound traffic from network 40 given appropriate IP address or subnet information. If the flow is an inbound flow from a known network, application traffic monitoring module 88 then determines whether the service class information in the inbound packet matches the current service class applied by traffic management device 130*a* to outbound flows for that traffic class (304). If the service classes do not match, application traffic monitoring module 88 then determines whether the service class applied to outbound flows associated with the given traffic class has been recently changed (306). For example, application traffic monitoring module 88 may compare the difference between the time the service class for the traffic class was last changed and the packet arrival time to a threshold period of time. This threshold comparison accommodates for the possibility that some packets, indicating the last service class, transmitted from network 40 may arrive after packets including the newly designated service class. If the service class associated with the outbound traffic class has not been recently changed, application traffic monitoring module 88 changes the service class for the outbound traffic class to the service class identified in the inbound packet (308). In one implementation, traffic monitoring module 88 also adjusts the state of the upgrade and/or downgrade objects, discussed above, as may be required (310). For example, if the service class has been upgraded, application traffic monitoring module 88 adds the traffic class identifier to the downgrade object such that it is now monitored for a possible downgrade when network conditions improve. In that instance, application traffic monitoring module 88, in one implementation, also removes the same traffic class identifier from the upgrade object. Oppositely, if the change represents a service downgrade, application traffic monitoring module 88 removes the traffic class identifier from the downgrade object and adds it to the upgrade object.

In one implementation, both traffic management devices 130, 130a analyze the performance of network applications, and include the coordination functionality illustrated in FIG. 6. A variety of configurations to coordinate operation of traffic management devices 130, 130a are possible. In one implementation, the application traffic monitoring functionality of traffic management device 130a, except for the coordination mechanism illustrated in FIG. 6, can be toggled off as to data flows transmitted between networks 40, 40a. This configuration allows the application performance measurements at traffic management device 130 to control the selection of differentiated network services for outbound and inbound data flows between networks 46, 40a for selected network applications.

Lastly, although the present invention has been described as operating in connection with end systems and networks primarily employing the HTTP, TCP and IP protocols, the present invention has application in computer network environments employing any suitable session layer, transport layer and network layer protocols. Moreover, one skilled in the art will recognize that the present invention can be applied to dynamically adjust a variety of differentiated services policies, such as MPLS, diffserv, and the like. In addition, although embodiments of the present invention discussed above operate to upgrade a given traffic class, embodiments of the present invention can be configured to downgrade or otherwise change a differentiated service class that would ordinarily apply to a given traffic class if the detected performance falls below a given threshold. For example, the present invention can be configured to downgrade data flows that, by default, receive a higher class of service, if during an analysis interval it is determined that the particular class of service is not having the desired effect on application performance, as indicated by response time measurements discussed above. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. In a network environment including a computer network operable to provide differentiated services to data flows based on tags or other identifiers associated with the packets in the data flows, wherein the differentiated services comprise a first service level and a second service level; a method comprising:
    monitoring the performance of a network application involving the transfer of packets between a first set of hosts and a second set of hosts over the computer network; and
    conditionally designating the packets for a selected service level supported by the computer network based on the monitored performance of the network application.

2. The method of claim 1 wherein the monitoring step comprises monitoring the response times between at least one host in the first set and at least one host in the second set.

3. The method of claim 2 wherein the monitoring the response times step comprises
    recording, at a network device disposed between a first set of hosts and a second set of hosts, the arrival time of the packets associated with the network application;
    computing, based on the recorded packet arrival times, one or more parameters characterizing the response time between at least one host in the first set and at least one host in the second set.

4. The method of claim 1 wherein designating the packets comprises marking the packets with a predetermined differentiated service policy.

5. The method of claim 1 wherein designating the packets comprises adding labels to the packets.

6. The method of claim 5 wherein the computer network is an MPLS network, and wherein the labels are MPLS tags.

7. The method of claim 1 wherein designating the packets comprises adding tags to the packets.

8. The method of claim 7 wherein the computer network is a diffserv network, and wherein the tags are diffserv tags.

9. The method of claim 1 wherein the monitoring step comprises monitoring the packet exchange (PET) time observed over the computer network.

10. The method of claim 1 wherein the monitoring step comprises measuring the network delay attributable to the differentiated services computer network.

11. The method of claim 1 further comprising monitoring usage of the service levels supported by the computer network; and wherein the conditional selecting step is further conditioned on the monitored usage of a given service level not exceeding a predetermined threshold level.

12. The method of claim 1 further comprising monitoring usage of the service levels supported by the computer network relative to a budget; and wherein the conditional selecting step is further conditioned on the monitored usage not exceeding the budget.

13. In a network environment including a computer network implementing a plurality of label-switched paths, a method comprising:
    marking, by default, packets associated with a network application for transfer over a first label-switched path of the computer network;
    monitoring the performance of the network application involving the transfer of packets between a first set of hosts and a second set of hosts over the computer network; and
    conditionally marking packets associated with the network application for transfer over a second label switched path in response to a degradation in performance of the network application.

14. The method of claim 13 wherein the first label-switched path is a least cost path.

15. The method of claim 14 wherein the second label-switched path provides a guaranteed minimum quality of service.

16. The method of claim 13 further comprising
    monitoring the performance, relative to at least one network application, of the first label-switched path of the computer network; and
    resuming the marking of packets associated with the network application for transfer over the first label-switched path when the performance of the first label-switched path crosses a threshold level.

17. The method of claim 13 wherein the monitoring step comprises monitoring the response times, relative to the network application, between at least one host in the first set and at least one host in the second set.

18. The method of claim 17 wherein the monitoring the response times step comprises
    recording, at a network device disposed between a first set of hosts and a second set of hosts, the arrival time of the packets associated with the network application;
    computing, based on the recorded packet arrival times, one or more parameters characterizing the response time between at least one host in the first set and at least one host in the second set.

19. The method of claim 13 wherein the computer network is an MPLS network, and wherein the marking step comprises applying MPLS tags designating selected label-switched paths.

20. The method of claim 13 wherein the monitoring step comprises monitoring the packet exchange (PET) time observed over the computer network.

21. The method of claim 13 wherein the monitoring step comprises measuring the network delay attributable to the differentiated services computer network.

22. In a computer network environment comprising a computer supporting a plurality network service classes, and interconnecting a first set of hosts and a second set of hosts, a method comprising
classifying data flows transmitted between the first set of hosts and the second set of hosts into one or more traffic classes;
designating the data flows for a default service level supported by the computer network based on the identified traffic class;
monitoring the performance of selected traffic classes; and
upgrading the service class applied to a first traffic class in the selected traffic classes upon detection of a degradation in performance of the first traffic class.

23. The method of claim 22 further comprising
monitoring the performance of the default service level supported by the computer network; and
resuming the marking of packets associated with the network application for transfer over the default service level when the performance of the default service level crosses a threshold level.

24. The method of claim 22 wherein monitoring the performance of selected traffic classes comprises monitoring the packet exchange (PET) time observed over the computer network.

25. The method of claim 22 wherein monitoring the performance of selected traffic classes comprises measuring the network delay attributable to the differentiated services computer network.

26. An apparatus facilitating the management of network traffic transmitted over a differentiated services network, comprising
a packet processor operative to
detect data flows in network traffic traversing a communications path, the data flows each comprising at least one packet;
parse at least one packet associated with a data flow into a flow specification,
a traffic classification database operative to
store at least one traffic class including a traffic class identifier and at least one attribute defining the traffic class;
compare attributes stored in association with traffic class identifiers to attributes of a data flow to match a traffic class that corresponds to the data flow;
an application performance monitoring module operative to
monitor the performance of at least one traffic class by maintaining at least one measurement parameter characterizing the transfer of packets between a first set of hosts and a second set of hosts over the computer network; and
conditionally designate at least one monitored traffic class for a selected service level supported by the differentiated services network based on the monitored performance of the traffic class; and
a traffic policy module operative to mark data flows with the at least one traffic class for the selected service level across the differentiated services network designated by the application performance monitoring module.

27. The apparatus of claim 26 wherein the traffic classification database is further operative to store a default service level in association with at least one traffic class; wherein the traffic policy module is operative to mark data flows corresponding to a given traffic class with the corresponding service level in the traffic classification database; and wherein the application performance monitoring module is operative to upgrade the service level applied to a traffic class by associating an upgraded service level identifier to the traffic class in the traffic classification database.

28. The apparatus of claim 26 wherein the packet processor is further operative to
parse at least one packet associated with the flow into a flow specification, wherein said flow specification contains at least one instance of any one of the following: a protocol family designation, a direction of packet flow designation, a protocol type designation, a pair of hosts, a pair of ports, a pointer to a MIME type a pointer to an application-specific attribute.

29. The apparatus of claim 28 wherein the traffic classification database is operative to
match the flow specification to a plurality of traffic classes, each of the traffic classes defined by one or more matching attributes; and thereupon,
having found a matching traffic class in the matching step, associate said flow specification with a traffic class from the plurality of traffic classes.

* * * * *